(12) United States Patent
Rathay et al.

(10) Patent No.: US 11,260,953 B2
(45) Date of Patent: Mar. 1, 2022

(54) SYSTEM AND METHOD FOR COOLING A LEADING EDGE OF A HIGH SPEED VEHICLE

(71) Applicant: General Electric Company, Schenectady, NY (US)

(72) Inventors: Nicholas William Rathay, Rock City Falls, NY (US); Brian Magann Rush, Niskayuna, NY (US); Narendra Digamber Joshi, Guilderland, NY (US); Timothy John Sommerer, Ballston Spa, NY (US); Gregory Alexander Natsui, Schenectady, NY (US); Brian Gene Brzek, Clifton Park, NY (US); Douglas Carl Hofer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 16/685,527

(22) Filed: Nov. 15, 2019

(65) Prior Publication Data
US 2021/0147061 A1    May 20, 2021

(51) Int. Cl.
*B64C 1/38* (2006.01)
*B64C 3/36* (2006.01)
*F28F 13/00* (2006.01)
*B64C 30/00* (2006.01)

(52) U.S. Cl.
CPC ............... *B64C 1/38* (2013.01); *B64C 3/36* (2013.01); *F28F 13/003* (2013.01); *B64C 30/00* (2013.01)

(58) Field of Classification Search
CPC ................ B64C 1/38; B64C 3/36; B64G 1/58
See application file for complete search history.

(56) References Cited

U.S. PATENT DOCUMENTS

| 2,451,692 A | 10/1948 | Pugh |
| 3,064,317 A | 11/1962 | Dobson |
| 3,119,333 A | 1/1964 | Loughran |

(Continued)

FOREIGN PATENT DOCUMENTS

| CN | 1201704 A | 12/1998 |
| CN | 104776740 A | 7/2015 |

(Continued)

OTHER PUBLICATIONS

U.S. Appl. No. 16/271,220, filed Feb. 8, 2019.
(Continued)

*Primary Examiner* — Brian M O'Hara
(74) *Attorney, Agent, or Firm* — Dority & Manning, P.A.

(57) ABSTRACT

A hypersonic aircraft includes one or more leading edge assemblies that are designed to cool the leading edge of certain portions of the hypersonic aircraft that are exposed to high thermal loads, such as extremely high temperatures and/or thermal gradients. Specifically, the leading edge assemblies may include an outer wall tapered to a leading edge or stagnation point. A coolant supply provides a flow of cooling fluid to a porous tip that is joined to the forward end of the outer wall and defines variable porosity and/or internal barriers to direct a flow of cooling fluid to the regions of the leading edge experiencing the highest thermal loading.

19 Claims, 5 Drawing Sheets

(56) References Cited

U.S. PATENT DOCUMENTS

| | | | |
|---|---|---|---|
| 3,138,009 A * | 6/1964 | McCreight | B64D 13/006 |
| | | | 62/315 |
| 3,151,712 A | 10/1964 | Jackson | |
| 3,731,893 A | 5/1973 | Stalmach, Jr. | |
| 3,777,975 A | 12/1973 | Kofink | |
| 3,785,591 A | 1/1974 | Stalmach, Jr. | |
| 3,808,833 A | 5/1974 | Allen et al. | |
| 3,883,096 A | 5/1975 | Osofsky | |
| 4,014,485 A | 3/1977 | Kinnaird et al. | |
| 4,203,489 A | 5/1980 | Swiadek | |
| 4,344,591 A | 8/1982 | Jackson | |
| 4,671,348 A | 6/1987 | Bauer | |
| 4,700,773 A | 10/1987 | Kehrer | |
| 4,771,365 A | 9/1988 | Chichocki et al. | |
| 4,915,164 A | 4/1990 | Harper | |
| 4,924,228 A | 5/1990 | Novak et al. | |
| 4,949,920 A * | 8/1990 | Schindel | B64C 1/38 |
| | | | 244/117 A |
| 4,966,229 A | 10/1990 | Senterfitt et al. | |
| 5,227,957 A | 7/1993 | Deters | |
| 5,257,757 A * | 11/1993 | Paul | B64G 1/58 |
| | | | 165/154 |
| 5,283,715 A | 2/1994 | Carlsten et al. | |
| 5,291,830 A | 3/1994 | Zwan | |
| 5,299,762 A | 4/1994 | Kosson et al. | |
| 5,343,632 A | 9/1994 | Dinh | |
| 5,351,917 A | 10/1994 | Bulman | |
| 5,439,351 A | 8/1995 | Artt | |
| 5,452,866 A | 9/1995 | Bulman | |
| 5,579,830 A | 12/1996 | Giammaruti | |
| 5,647,429 A | 7/1997 | Oktay et al. | |
| 5,720,339 A | 2/1998 | Glass et al. | |
| 5,761,909 A | 6/1998 | Hughes et al. | |
| 5,899,265 A | 5/1999 | Schneider et al. | |
| 5,975,841 A | 11/1999 | Lindemuth et al. | |
| 6,164,061 A | 12/2000 | Chevalier et al. | |
| 6,233,150 B1 | 5/2001 | Lin et al. | |
| 6,260,613 B1 | 7/2001 | Pollard | |
| 6,301,332 B1 | 10/2001 | Rogers et al. | |
| 6,359,218 B1 | 3/2002 | Koch et al. | |
| 6,360,813 B1 | 3/2002 | Katoh et al. | |
| 6,367,740 B1 | 4/2002 | Johnson et al. | |
| 6,378,605 B1 | 4/2002 | Kutscher et al. | |
| 6,392,883 B1 | 5/2002 | Ali | |
| 6,430,931 B1 | 8/2002 | Horner | |
| 6,478,257 B1 | 11/2002 | Oh et al. | |
| 6,624,349 B1 | 9/2003 | Bass | |
| 6,631,755 B1 | 10/2003 | Kung et al. | |
| 6,678,159 B1 | 1/2004 | Barcley | |
| 6,889,755 B2 | 5/2005 | Zuo et al. | |
| 6,983,790 B2 | 1/2006 | Ippoushi et al. | |
| 6,994,152 B2 | 2/2006 | Rosenfeld et al. | |
| 7,002,247 B2 | 2/2006 | Mok et al. | |
| 7,007,741 B2 | 3/2006 | Sen et al. | |
| 7,032,654 B2 | 4/2006 | Wand et al. | |
| 7,086,247 B2 | 8/2006 | Campbell et al. | |
| 7,128,532 B2 | 10/2006 | Petervary et al. | |
| 7,189,064 B2 | 3/2007 | Helder et al. | |
| 7,232,093 B2 | 6/2007 | Behrens et al. | |
| 7,256,992 B1 | 8/2007 | Stewart et al. | |
| 7,369,410 B2 | 5/2008 | Chen et al. | |
| 7,377,098 B2 | 5/2008 | Walker et al. | |
| 7,473,995 B2 | 1/2009 | Rumer et al. | |
| 7,594,537 B2 | 9/2009 | Hou et al. | |
| 7,686,248 B2 | 3/2010 | Weber et al. | |
| 7,704,565 B2 | 4/2010 | Slaughter | |
| 7,768,783 B1 | 8/2010 | Kajiya et al. | |
| 7,859,844 B2 | 12/2010 | Nguyen et al. | |
| 7,871,578 B2 | 1/2011 | Schmidt | |
| 7,900,438 B2 | 3/2011 | Venkataramani et al. | |
| 7,907,409 B2 | 3/2011 | Wyatt et al. | |
| 7,928,562 B2 | 4/2011 | Arvelo et al. | |
| 7,942,025 B1 | 5/2011 | Musone | |
| 8,047,269 B2 | 11/2011 | Kang et al. | |
| 8,109,324 B2 | 2/2012 | Farid et al. | |
| 8,176,972 B2 | 5/2012 | Mok | |
| 8,323,122 B2 | 12/2012 | Soracco et al. | |
| 8,424,203 B2 | 4/2013 | dos Santos e Lucato | |
| 8,464,535 B2 | 6/2013 | White et al. | |
| 8,466,486 B2 | 6/2013 | Yuan | |
| 8,475,112 B1 | 7/2013 | Ryznic et al. | |
| 8,549,749 B2 | 10/2013 | Zimbeck et al. | |
| 8,610,761 B2 | 12/2013 | Haisty et al. | |
| 8,616,834 B2 | 12/2013 | Knight, III et al. | |
| 8,656,722 B2 | 2/2014 | Norris et al. | |
| 8,678,316 B2 | 3/2014 | Rawlings et al. | |
| 8,684,310 B2 | 4/2014 | Rawlings et al. | |
| 8,844,877 B1 | 9/2014 | Driemeyer et al. | |
| 8,934,235 B2 | 1/2015 | Rubenstein et al. | |
| 8,937,384 B2 | 1/2015 | Bao et al. | |
| 9,475,593 B2 | 10/2016 | Pinney et al. | |
| 9,476,651 B2 | 10/2016 | Thiagrarajan et al. | |
| 9,516,791 B2 | 12/2016 | Chester et al. | |
| 9,913,411 B2 | 3/2018 | De Bock et al. | |
| D818,093 S | 5/2018 | Emo et al. | |
| 9,974,157 B2 | 5/2018 | de Bock et al. | |
| 10,173,780 B2 | 1/2019 | Mackin et al. | |
| 10,209,009 B2 | 2/2019 | Gerstler et al. | |
| 10,356,945 B2 | 7/2019 | Rush et al. | |
| 10,386,127 B2 | 8/2019 | Rush et al. | |
| 2002/0021556 A1 | 2/2002 | Dibene et al. | |
| 2002/0144811 A1 | 10/2002 | Chou et al. | |
| 2003/0043547 A1 | 3/2003 | Nealis et al. | |
| 2004/0011503 A1 | 1/2004 | Kung et al. | |
| 2004/0129032 A1 | 7/2004 | Severns et al. | |
| 2005/0103473 A1 | 5/2005 | Todd et al. | |
| 2005/0207120 A1 | 9/2005 | Tseng et al. | |
| 2006/0060328 A1 | 3/2006 | Ewes et al. | |
| 2006/0140346 A1 | 6/2006 | McCarthy | |
| 2006/0145020 A1 | 7/2006 | Buehler | |
| 2007/0012429 A1 | 1/2007 | Siu | |
| 2007/0017659 A1 | 1/2007 | Brunschwiler et al. | |
| 2007/0151708 A1 | 7/2007 | Touzov | |
| 2007/0247813 A1 | 10/2007 | Colbert et al. | |
| 2008/0149299 A1 | 6/2008 | Slaughter | |
| 2008/0170368 A1 | 7/2008 | Chen et al. | |
| 2008/0235977 A1 | 10/2008 | Kuwabara | |
| 2009/0040726 A1 | 2/2009 | Hoffman et al. | |
| 2009/0090109 A1 | 4/2009 | Mills et al. | |
| 2009/0151900 A1 | 6/2009 | Huang | |
| 2009/0244830 A1 | 10/2009 | Wyatt et al. | |
| 2010/0051227 A1 | 3/2010 | Anbudurai | |
| 2010/0065256 A1 | 3/2010 | Wilcoxon et al. | |
| 2010/0109137 A1 | 5/2010 | Sasaki et al. | |
| 2010/0170101 A1 | 7/2010 | Taniguchi et al. | |
| 2010/0200199 A1 | 8/2010 | Habib et al. | |
| 2010/0212656 A1 | 8/2010 | Qiu et al. | |
| 2010/0320187 A1 | 12/2010 | Griffin et al. | |
| 2011/0016886 A1 | 1/2011 | Ghoshal et al. | |
| 2011/0168159 A1 | 7/2011 | Lataperez et al. | |
| 2011/0209864 A1 | 9/2011 | Figus et al. | |
| 2011/0232877 A1 | 9/2011 | Meyer, IV et al. | |
| 2011/0253344 A1 | 10/2011 | Kuhn et al. | |
| 2011/0259041 A1 | 10/2011 | Kuehl et al. | |
| 2011/0279969 A1 | 11/2011 | Memon | |
| 2011/0279970 A1 | 11/2011 | Guan | |
| 2012/0107662 A1 | 5/2012 | Roemmler et al. | |
| 2012/0110869 A1 | 5/2012 | Bellinger et al. | |
| 2012/0125573 A1 | 5/2012 | Rubenstein et al. | |
| 2012/0155015 A1 | 6/2012 | Govindasamy et al. | |
| 2012/0192574 A1 | 8/2012 | Ghoshal et al. | |
| 2012/0206880 A1 | 8/2012 | Andres et al. | |
| 2012/0227926 A1 | 9/2012 | Field et al. | |
| 2012/0250259 A1 | 10/2012 | Lee et al. | |
| 2012/0319410 A1 | 12/2012 | Ambrosek et al. | |
| 2012/0331269 A1 | 12/2012 | Aras | |
| 2013/0003307 A1 | 1/2013 | Jang | |
| 2013/0008632 A1 | 1/2013 | Brunschwiler et al. | |
| 2013/0056170 A1 | 3/2013 | Klemencic | |
| 2013/0077245 A1 | 3/2013 | Gradinger et al. | |
| 2013/0079693 A1 | 3/2013 | Ranky et al. | |
| 2013/0098417 A1 | 4/2013 | Gavillet | |
| 2013/0105122 A1 | 5/2013 | Campbell et al. | |
| 2013/0107455 A1 | 5/2013 | Cottet et al. | |

(56) References Cited

U.S. PATENT DOCUMENTS

| | | | |
|---|---|---|---|
| 2013/0170142 | A1 | 7/2013 | Weaver, Jr. et al. |
| 2013/0189594 | A1 | 7/2013 | Breit et al. |
| 2013/0206374 | A1 | 8/2013 | Rosin et al. |
| 2014/0014493 | A1 | 1/2014 | Ryan |
| 2014/0037873 | A1 | 2/2014 | Cheung et al. |
| 2014/0060771 | A1 | 3/2014 | Bell et al. |
| 2014/0083653 | A1 | 3/2014 | Kempers et al. |
| 2014/0090808 | A1 | 4/2014 | Bessho et al. |
| 2014/0102662 | A1 | 4/2014 | Grama et al. |
| 2014/0104787 | A1 | 4/2014 | Chainer et al. |
| 2014/0150464 | A1 | 6/2014 | Bloedow et al. |
| 2014/0154539 | A1 | 6/2014 | Kwok et al. |
| 2014/0158334 | A1 | 6/2014 | Dellea et al. |
| 2014/0163445 | A1 | 6/2014 | Pallari et al. |
| 2014/0174086 | A1 | 6/2014 | Kare et al. |
| 2014/0190667 | A1 | 7/2014 | McGlen et al. |
| 2014/0233174 | A1 | 8/2014 | Demange |
| 2014/0251585 | A1 | 9/2014 | Kusuda et al. |
| 2014/0268831 | A1 | 9/2014 | Shih et al. |
| 2014/0268969 | A1 | 9/2014 | Crouch et al. |
| 2014/0284020 | A1 | 9/2014 | Amir et al. |
| 2014/0321998 | A1 | 10/2014 | Maar et al. |
| 2014/0334104 | A1 | 11/2014 | Yang et al. |
| 2014/0340845 | A1 | 11/2014 | Straznicky et al. |
| 2014/0362590 | A1 | 12/2014 | Chen et al. |
| 2014/0368992 | A1 | 12/2014 | Strader et al. |
| 2015/0000871 | A1 | 1/2015 | Farmer et al. |
| 2015/0027669 | A1 | 1/2015 | Kokas et al. |
| 2015/0040888 | A1 | 2/2015 | Zakhidov et al. |
| 2015/0080495 | A1 | 3/2015 | Heikkila |
| 2015/0237762 | A1 | 8/2015 | Holt et al. |
| 2015/0289413 | A1 | 10/2015 | Rush et al. |
| 2015/0366105 | A1 | 12/2015 | Dunwoody et al. |
| 2016/0116218 | A1 | 4/2016 | Shedd et al. |
| 2016/0124474 | A1 | 5/2016 | So et al. |
| 2016/0202003 | A1 | 7/2016 | Gerstler et al. |
| 2016/0305279 | A1 | 10/2016 | Gerstler et al. |
| 2016/0319135 | A1 | 11/2016 | Hecht |
| 2017/0064868 | A1 | 3/2017 | Rush et al. |
| 2017/0067693 | A1 | 3/2017 | Rush et al. |
| 2017/0167838 | A1 | 6/2017 | Quertelet |
| 2017/0276440 | A1 | 9/2017 | Kenworthy et al. |
| 2017/0363363 | A1 | 12/2017 | Lassini et al. |
| 2018/0022439 | A1 | 1/2018 | Stanley et al. |
| 2018/0057191 | A1 | 3/2018 | Zhang et al. |
| 2018/0356794 | A1 | 12/2018 | Wiedenhoefer et al. |

FOREIGN PATENT DOCUMENTS

| | | | |
|---|---|---|---|
| CN | 104859835 | | 8/2015 |
| CN | 107914862 | A * | 4/2018 |
| CN | 108423154 | A | 8/2018 |
| CN | 109110104 | A * | 1/2019 |
| DE | 2837802 | A1 | 8/1979 |
| DE | 102011086786 | B3 | 3/2013 |
| EP | 1054583 | A2 | 11/2000 |
| GB | 2476253 | A | 6/2011 |
| JP | 9-4962 | | 1/1997 |
| TW | I289655 | B | 11/2007 |
| WO | WO2013097031 | A2 | 7/2013 |
| WO | WO2016/057471 | A1 | 4/2016 |

OTHER PUBLICATIONS

Great Britain Office Action Corresponding to GB Application No. GB16149072 dated Oct. 30, 2017.

Great Britain Office Action Corresponding to GB Application No. GB16149072 dated Mar. 20, 2018.

Great Britain Office Action Corresponding to GB Application No. GB16149072 dated Jul. 27, 2018.

Great Britain Search Report and Examination Corresponding to GB Application No. 1614907.2 dated Jan. 24, 2017.

Air pollution Control Technology Fact Sheet, Wet Electrostatic Precipitator (ESP), Wire-Pipe Type, EPA-452/F-03-029, Oct. 23, 2018, pp. 1-4. Retrieved from Internet URL: https://www3.epa.gov/ttnchie1/mkb/documents/fwespwpi.pdf.

Ameli et al., A Novel Method for Manufacturing Sintered Aluminium Heat Pipes (SAHP), Applied Thermal Engineering, vol. 52, Issue 2, Apr. 15, 2013, pp. 498-504.

Arif-Uz-Zaman et al., A Novel Dehumidification Technique Using Electric Field, IEEE Transactions on Industry Applications, vol. 32, Issue 1, Jan./Feb. 1996, pp. 36-40.

Battery Prognostics-Prognosis Framework, National Aeronautics and Space Administration, May 8, 2014, pp. 1-3. Retrieved from Internet URL: https://ti.arc.nasa.gov/tech/dash/groups/pcoe/battery-prognostics/prognosis-framework/.

Bendt, Are We Missing Energy Savings in Clothes Dryers?, ACEEE Summer Study on Energy Efficiency in Buildings, 2010, pp. 9-42 to 9-55.

Brackett et al., Topology Optimization for Additive Manufacturing, Wolfson School of Mechanical and Manufacturing Engineering, Loughborough University, Aug. 17, 2011, Loughborough, Leicestershire, LE11 3TU, UK, pp. 348-362.

Brotan et al., The hybrid manufacturing cell: Determining key parameters in the integration of powder bed fusion with high speed milling, Industrial Engineering and Engineering Management (IEEM), 2012 IEEE International Conference on Dec. 10-13, 2012, Hong Kong, pp. 583-587.

Brown et al., Thermal management issues and evaluation of a novel, flexible substrate, 3-dimensional (3-D) packaging concept, Multichip Modules and High Density Packaging, 1998 International Conference Apr. 15-17, 1998, Denver, CO , pp. 135-140.

Buckley et al., Application of Wet Electrostatic Precipitation Technology In The Utility Industry For Multiple Pollutant Control Including Mercury, Croll-Reynolds Clean Air Technologies, 2003, pp. 1-14.

Buekens, Electrostatic Precipitators, Pollution Control Technologies, Encyclopedia of Life Support Systems (EOLSS), vol. 1, 2008, pp. 1-9.

Building Energy Efficiency Frontiers and Incubator Technologies Benefit—2014, Funding Opportunity Announcement (FOA) No. DE-FOA-0001027, 2014, pp. 1-94.

Dukhan et al., An improved PCM Heat Storage Technology Utilizing Metal Foam, 2010 $12^{th}$ IEEE Intersociety Conference on Thermal and Thermomechanical Phenomena in Electronic Systems, (ITherm), Las Vegas, NV, Jun. 2-5, 2010, pp. 1-7.

Energy Star Emerging Technology Award Requirements: Advanced Dryers, Feb. 9, 2012, p. 1. Retrieved from Internet URL: https://www.energystar.gov/sites/default/files/asset/document/2012_ENERGY_STAR_Emerging_Technology_Award_Advanced_Clothes_Dryers_Requirements.pdf.

Engineers guide to military aerospace and avionics, An Interview with General Micro Systems' CEO Ben Sharfi, Extension Media, Application Solutions, 2014, 44 Pages.

Goswami et al., Analysis of Thermal Energy Storage in Cylindrical PCM Capsules Embedded in a Metal Matrix, Energy Conversion Engineering Conference 1990, IECEC-90 Proceedings of the $25^{th}$ Inersociety, vol. 4, Aug. 12-17, 1990, pp. 257-262.

Green et al., Dynamic Thermal management of high heat flux devices using embedded solid-liquid phase change materials and solid state coolers, Thermal and Thermomechanical Phenomena in Electronic Systems, 13th IEEE Intersociety Conference on May 30, 2012-Jun. 1, 2012, pp. 853-862.

Gulli et al., Variable Transpiration Cooling for the Thermal Management of Reusable Hypersonic Vehicles, Aerospace Science and Technology, Elsevier, vol. 29, 2013, pp. 434-444.

Gurijanov, Ajax: New Directions in Hypersonic Technology, American Institute of Aeronautics and Astronautics, Inc., AIAA Paper 96-4609, 1996, pp. 9.

Hara et al., Optimization for Chip Stack in 3-D Packaging, Advanced Packaging, IEEE Transactions on, vol. 28, Issue 3, Aug. 2005, pp. 367-376.

Lee, Ventless Drying—The New Standard of Efficiency, Jul. 30, 2010, pp. 1-2.

(56) References Cited

OTHER PUBLICATIONS

Miles et al., Plasma-Enhanced Hypersonic Performance Enabled by MHD Power Extraction, AIAA 2005-0561, 43$^{rd}$ AIAA Aerospace Sciences Meeting and Exhibit, Reno Nevada, Jan. 10-13, 2005, 16 Pages.
Mochizuki et al., A Review of Heat Pipe Application Including New Opportunities, Frontiers in Heat Pipes, Global Digital Central, vol. 2, 013001, 2011, 15 Pages.
Pingsheng et al., Effect of Charge on Growth of Droplets with Ionic Condensation Nuclei, Chinese Science Bulletin, vol. 56, No. 18, Jun. 2011, pp. 1942-1946.
Radiant Heating With Infrared—A Technical Guide to Understanding and Applying Infrared Heaters, Watlow Electric Manufacturing Company, 1997, pp. 1-39.
Rawal et al., Thermal management for multifunctional structures, Advanced Packaging, IEEE Transactions, vol. 22, Issue: 3, Denver, CO,. Aug. 1999, pp. 379-383.
Residential Clothes Dryers, Energy Star Market & Industry Scoping Report: Dryers, Nov. 2011, pp. 1-18.
Reznikov et al., Corona discharge in the steam for electrostatically enforced condensation, Proceedings 2012 Electrostatics Joint Conference, Jun. 2012, pp. 1-4.
Reznikov et al., Electrohydrodynamic Enforcement of Evaporation and Gas Flow, IEEE Transactions on Industry Applications, vol. 47, No. 2, Mar./Apr. 2011, pp. 1036-1042.
Robak, Latent Heat Thermal Energy Storage with Embedded Heat Pipes for Concentrating Solar Power Applications, University of Connecticut Master's Theses, Paper 229. Obtained from: https://opencommons.uconn.edu/gs_theses/229/.
Salazar et al., Electrospray as an Enforcement of Steam Condensation, Proc. ESA Annual Meeting on Electrostatics, 2013, pp. 1-10.
Subracks, Enclosure Frames, Pixux Technologies.
Tapuchi et al., Obtaining Fresh Water from Atmosphere using Electrostatic Precipitation: Theory, Efficiency and Limitations, E-Water, Official Publication of the European Water Association (EWA), 2010, pp. 1-6.
Vanwie_et al., Hypersonic Airbreathing Propulsion, John Hopkins APL Technical Digest, vol. 26, No. 4, 2005, pp. 430-437.
Wang et al., Numerical Investigation on the Optimization of Local Transpiration Cooling Effectiveness, Applied Thermal Engineering, ScienceDirect, vol. 127, 2017, pp. 58-69.
Wu et al., Investigation of the Polymer Wick Structure Applied to Loop Heat Pipe, 2009 4th International Microsystems, Packaging, Assembly and Circuits Technology Conference, Oct. 21-23, 2009, pp. 368-371.
Yang, Corona-Driven Air Propulsion for Cooling of Microelectronics, Master of Science in Electrical Engineering, 2002, pp. 1-81.
Yogev et al., PCM Storage System with Integrated Active Heat Pipe, Energy Procedia, Proceedings of the Solar PACES 2013 International Conference, ScienceDirect, vol. 49, 2014, pp. 1061-1070.
Zukowski, Experimental Study of Short Term Thermal Energy Storage Unit Based on Enclosed Phase Change Material in Polyethylene Film Bag, Energy Conversion and Management, vol. 48, Issue 1, Jan. 2007, pp. 166-173.

\* cited by examiner

SYSTEM AND METHOD FOR COOLING A LEADING EDGE OF A HIGH SPEED VEHICLE

FIELD

The present subject matter relates generally leading edge technologies for use in high speed vehicles, such as hypersonic aircraft.

BACKGROUND

High speed vehicles often experience thermal management issues resulting from high heat load experienced during high speed operation, particularly at leading edges where the free air stream impinges on the vehicle. For example, in an application involving hypersonic aircrafts, the leading edges can include the nose, engine cowls, and the leading edges of wings and stabilizers. Particularly when these vehicles are operating in the hypersonic speed range (e.g., Mach 5 or greater), the leading edges may be subjected to very high heat load (e.g., 500-1500 W/cm$^2$) as the incident airflow passes through a bow shock and comes to rest at the vehicle surface, converting the kinetic energy of the gas to internal energy and greatly increasing its temperature. Unmitigated exposure to such thermal loading can result in component degradation and/or failure.

Improvements in materials and manufacturing techniques have enabled hypersonic aircraft to operate at higher speeds and temperatures. For example, materials have been developed to increase the temperatures that a component can withstand while maintaining its structural integrity. In this regard, for example, nickel-based superalloys might be used to 800° C., single-crystal materials might be used to 1200° C., and refractory metals may be required for even higher temperatures. In addition, various cooling technologies have been developed to provide cooling to the leading edges of hypersonic vehicles. However, corresponding advancements in vehicle speed and duration of high speed flight times have created the need for further improvement in the cooling ability and high temperature durability of the leading edges of high speed vehicles.

Accordingly, improvements to hypersonic aircraft and propulsion technologies would be useful. More specifically, improvements in leading edge technologies and methods of cooling leading edges or hypersonic vehicles would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a leading edge assembly for a hypersonic vehicle is provided. The leading edge assembly includes an outer wall that is tapered to a forward end, a porous tip joined to the forward end of the outer wall and extending forward toward a leading edge, the porous tip including a first porous region at the leading edge and a second porous region downstream from the leading edge, wherein a first porosity of the first porous region is greater than a second porosity of the second porous region, and a coolant supply in fluid communication with the porous tip for providing a flow of coolant through the first porous region and the second porous region.

According to another exemplary embodiment, a porous tip for a leading edge assembly of a hypersonic vehicle, the porous tip defining a radial direction extending from a center of curvature of the porous tip and a circumferential direction is provided. The porous tip includes a plurality of porous segments spaced apart along the circumferential direction, each of the plurality of porous segments extending from an inner surface of the porous tip to an outer surface of the porous tip, wherein at least two of the plurality of porous segments have different porosities, and a plurality of internal barriers, each of the plurality of porous segments being separated from adjacent segments of the plurality of porous segments by at least one of the plurality of internal barriers.

According to still another exemplary embodiment, a leading edge assembly for a hypersonic vehicle is provided. The leading edge assembly includes an outer wall that is tapered to a forward end, a porous tip joined to the forward end of the outer wall and extending forward toward a leading edge, the porous tip including a plurality of porous regions, each of the plurality of porous regions having a different porosity, and wherein the plurality of porous regions are spaced apart along a circumferential direction or a radial direction, and a coolant supply in fluid communication with the porous tip for providing a flow of coolant through the plurality of porous regions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
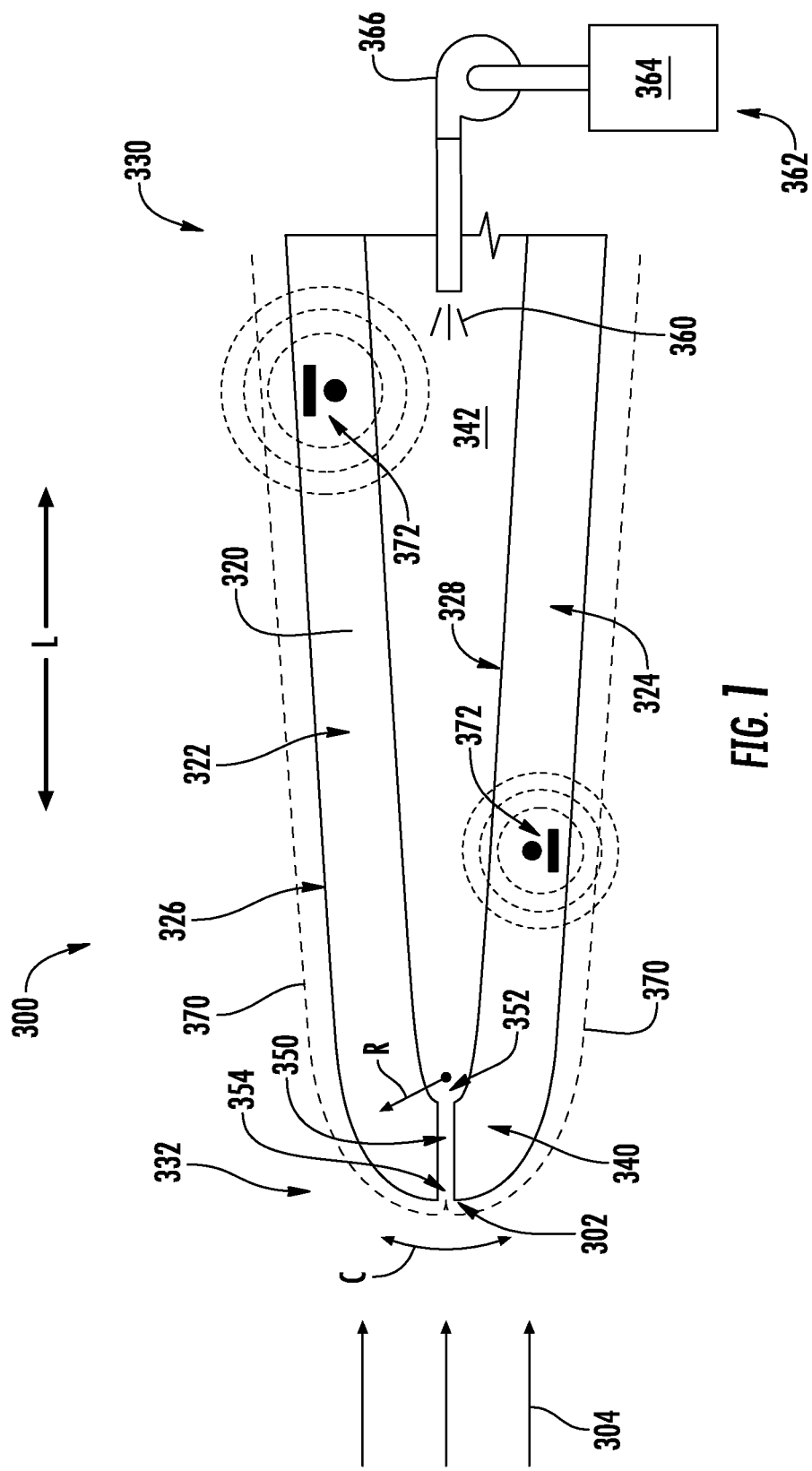
FIG. 1 is a close-up, cross-sectional, schematic view of a leading edge of a hypersonic vehicle in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, aspects of the present subject matter are directed to leading edge assemblies for high speed aircraft or vehicles, such as hypersonic aircraft. As used herein, the term "hypersonic" refers generally to air speeds of about Mach 4 up to about Mach 10 or greater, such as Mach 5 and up. However, it should be appreciated that aspects of the present subject matter are not limited only to hypersonic flight, but may instead apply to applications involving other high speed vehicles, projectiles, objects, etc. The description of leading edge assemblies herein with respect to use on a hypersonic aircraft are only examples intended to facilitate the explanation of aspects of the present subject matter. The present subject matter is not limited to such exemplary embodiments and applications.

Notably, as explained above, high speed vehicles, such as a hypersonic aircraft, typically experience extremely high temperatures and thermal gradients during high speed or hypersonic operation. The temperature gradients that are caused by the high heat flux are often a more severe problem than the temperature itself. For example, the thermal conductivity of the structural material, in combination with the heat flux, sets the temperature gradient within the material, and at high heat loads this gradient leads to mechanical stresses that cause plastic deformation or fracture of the material. The heat load to the structural material should be reduced to maintain the structural integrity of the components.

As explained above, the leading edges of such high speed vehicles often experience the highest thermal loading. For example, a hypersonic vehicle may include a plurality of leading edge assemblies (e.g., identified generally herein by reference numeral 300) which experience high thermal loads during hypersonic flight. In this regard, leading edge assemblies 300 may be provided on a forward end of the aircraft wings, the nose cone, the vertical stabilizer, the engine cowls of the propulsion engines, or other leading edges or surfaces of the hypersonic aircraft. According to exemplary embodiments of the present subject matter, leading edge assemblies 300 include features for mitigating the effects of such thermal loading, e.g., by carrying heat out of the region.

Notably, it is typically desirable to make leading edge assemblies 300 as sharp or pointed as possible, e.g., in order to reduce drag on the hypersonic vehicle. However, referring now to FIG. 1, when leading edge assemblies 300 are formed into a small radius of curvature, extremely high temperatures and thermal gradients are experienced within leading edge assembly 300 at its forward or leading edge, also referred to herein as a stagnation line, a stagnation point 302, or similar terms. In this regard, as a hypersonic vehicle is traveling through air at hypersonic speeds, a free stream flow of air (e.g., identified herein by reference numeral 304) passes over and around leading edge assembly 300, thereby generating large thermal loads. Aspects of the present subject matter are directed to thermal management technologies and features for cooling leading edge assemblies 300, with a particular focus on the regions close to stagnation point 302, where the most serious thermal management issues typically arise.

It should be appreciated that the leading edge assemblies 300 illustrated herein are simplified cross section illustrations of exemplary leading edges. The size, configuration, geometry, and application of such leading edge technologies may vary while remaining within the scope of the present subject matter. For example, the leading edge assemblies 300 described herein define a radius of between about 1 mm and 3 mm. However, according to alternative embodiments, leading edge assemblies could have any other suitable radii.

The cooling technologies and thermal management features are described herein as being used to cool portions of one or more parts of a hypersonic aircraft, such as the leading edges of the wings, nose, propulsion engines, or other parts of the hypersonic aircraft that experience large temperatures and thermal gradients. However, it should be appreciated that aspects of the present subject matter may be used to manage thermal loading such as high temperatures and thermal gradients within any component and in any suitable application. In this regard, for example, aspects of the present subject matter may apply to any other hypersonic vehicle or to any other technology or system having components that are exposed to high temperatures and/or large temperature gradients.

In addition, although various techniques, component configurations, and systems are described herein for cooling leading edge assemblies 300 of a hypersonic vehicle, it should be appreciated that variations and modifications may be made to such technologies without departing from the scope of the present subject matter. In addition, one or more such technologies may be used in combination with each other to achieve improved cooling and thermal management. In this regard, although each cooling technology is described in isolation in order to clearly describe how each technology functions, the embodiments described are only examples intended for the purpose of illustration and explanation, and are not intended to limit the scope of the present subject matter in any manner.

In addition, according to exemplary embodiments of the present subject matter, some or all components described herein may be formed using an additive-manufacturing process, such as a 3-D printing process. The use of such a process may allow certain components of a hypersonic vehicle, such as leading edge assemblies 300, to be formed integrally, as a single monolithic component, or as any suitable number of sub-components. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be metal, concrete, ceramic, epoxy, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Referring still to FIG. 1, leading edge assembly 300 will be described in more detail according to an exemplary embodiment of the present subject matter. Specifically, FIG. 1 provides a cross-sectional view of a leading edge assembly 300, which may be positioned at a leading edge (e.g., a forward end, a leading end, upstream end, etc.) of any component of a hypersonic aircraft. For example, leading edge assembly 300 may be, e.g., a leading edge of an inlet duct to a hypersonic propulsion engine, a leading edge of a turbine engine, a leading edge of a wing of the aircraft, a nose of the aircraft, a forward end of a vertical stabilizer, etc.

As explained herein, large thermal loads may be experienced by leading edge assemblies 300 during hypersonic flight operations. As used herein, the terms "thermal load" and the like are intended generally to refer to the high temperatures, temperature gradients, or heat flux experienced within a component of a hypersonic or high-speed vehicle. According to exemplary embodiments of the present subject matter, leading edge assemblies 300 are formed or provided with thermal regulation features or technologies for managing these thermal loads.

For example, as described in more detail below with reference to FIG. 1, leading edge assembly 300 may include features for providing a coolant, such as a cooling fluid or cooling material through an outer wall 320 of leading edge assembly 300 to reduce a temperature of outer wall 320 and/or a temperature gradient experienced within leading edge assembly 300. FIGS. 2 through 5 provide cooling technologies for leading edge assemblies 300 according to alternative embodiments. It should be appreciated that the thermal regulation features and technologies described herein for each exemplary leading edge assembly 300 may be used alone or in combination with any other leading edge technologies described herein to regulate the thermal loading on one or more leading edge assemblies 300 of a hypersonic vehicle, or any other surface of any other component that experiences high thermal loading.

As explained above, outer wall 320 and other components of leading edge assembly 300 may be formed from any suitable material. According to an exemplary embodiment, such materials are selected to withstand the high thermal loading experienced by the leading edges of a hypersonic aircraft. For example, outer wall 320 may be constructed from at least one of aluminum, titanium, titanium aluminide, tungsten, tungsten alloy, nickel superalloy, refractory metal, single-crystal metal, ceramic, ceramic matrix composite (CMC), ultra-high temperature ceramics (UHTCs, including high melting point diborides, nitrides, etc.), or carbon-carbon composite. In addition, or alternatively, outer wall 320 may include composites such as silicon carbide (SiC), SiC composites, carbon-fiber reinforced SiC matrix and other carbide matrix composites, composites with and without surface coatings, and/or high entropy alloys, including refractories, platinum group metals, hafnium alloys, etc. Nevertheless, it may still be desirable in certain applications to provide additional cooling capacity for thermal management of the high heat loads experienced by leading edge assembly 300. Moreover, as explained above, the additive manufacturing technologies may be used to print leading edge assembly 300 (e.g. including outer wall 320) as a single monolithic component, and may facilitate improved cooling technologies and leading edge features.

As is shown in the embodiment depicted, the outer wall 320 is generally formed by a first wall section 322 and a second wall section 324. More specifically, the first wall section 322 and the second wall section 324 each include outer surfaces together forming an outer surface 326 and inner surfaces together forming an inner surface 328. In addition, first wall section 322 and second wall section 324 may be angled relative to each other such that leading edge assembly 300 is tapered from an aft end 330 of leading edge assembly 300 to a forward end 332 of leading edge assembly 300 (e.g., which corresponds to stagnation point 302). In other words, leading edge assembly 300 is wider or taller proximate aft end 330 of leading edge assembly 300 and narrows as it approaches stagnation point 302. Notably, the taper angle may vary depending on aerodynamic and other considerations while remaining within the scope of the present subject matter. For example, according to exemplary embodiments, leading edge assembly 300 may not be symmetric, e.g., defining a sharper angle on one side.

As described above, for the embodiment shown, the outer surfaces 326 of the first wall section 322 and the second wall section 324 meet at a stagnation point 302 and generally form a leading edge portion 340 of the outer wall 320. The leading edge portion 340 also defines at least part of outer surface 326 and inner surface 328. For the embodiment depicted, the leading edge assembly 300 includes a cavity or a chamber 342 positioned between the first wall section 322 and the second wall section 324 and in fluid communication with the inner surface 328 of the leading edge portion 340. In addition, according to an exemplary embodiment, leading edge portion 340 defines at least one fluid passageway 350 that passes through outer wall 320.

More specifically, according to the illustrated embodiment, flow passageway 350 is a hole or aperture that is defined through outer wall 320 such that it extends from an inlet 352 positioned at inner surface 328 to and outlet 354 positioned at outer surface 326. In addition, as illustrated, outlet 354 is positioned at stagnation point 302 or at forward end 332 of leading edge assembly 300. Although a single fluid passageway 350 is illustrated in the cross-section depicted in FIG. 1, it should be appreciated that fluid passageway 350 may instead be an elongated slot extending along a leading edge or stagnation line of leading edge assembly 300. According still other embodiments, leading edge portion 340 of leading edge assembly 300 may include a plurality of fluid passageways 350 spaced apart from each other along a length of leading edge assembly 300, e.g., such as along a span of aircraft wings.

Indeed, fluid passageways 350 may be defined through outer wall 320 in any suitable number, geometry, configuration, etc. For example, leading edge assembly 300 may generally define a radial direction R and a circumferential direction C. The radial direction R that extends outward from a center of curvature (not labeled) of leading edge portion 340 within the cross-sectional plane illustrated in FIG. 1. The circumferential direction C generally wraps around leading edge assembly 300 from first wall section 322 to second wall section 324 as shown in FIG. 1. In addition, leading edge assembly 300 may define a longitudinal direction L, which according to the exemplary embodiment described herein, corresponds to the longitudinal direction L of a hypersonic aircraft and is substantially parallel to an angle of attack defined between leading edge assembly 300 and the primary direction of the flow of air 304.

According to the illustrated embodiment, fluid passageway 350 extends through outer wall 320 along the radial direction R. However, it should be appreciated that according to alternative embodiments, fluid passageways 350 may pass through outer wall 320 at an angle other than the radial direction R, may pass along a length of first wall section 322 and/or second wall section 324, may terminate at other locations both on inner surface 328 and outer surface 326, may vary in cross-sectional size or profile, or may vary in any other suitable manner for providing a flow of cooling fluid 360 to a desired location within or on leading edge assembly 300.

In this regard, leading edge assembly 300 may further include a coolant supply 362 for providing the flow of cooling fluid 360 through fluid passageway 350 and out of leading edge assembly 300. As used herein, the term "cooling fluid," "coolant," and the like are generally intended to refer to any material that passes through outer wall 320 to cool outer surface 326 of leading edge assembly 300. According to an embodiment of the present subject matter, as described in more detail below, cooling fluid 360 may include at least one of air, water, steam, liquid metal, carbon dioxide, argon, helium, etc.

It should be further appreciated that the cooling fluid 360 is not limited to a particular state or phase of material. In this regard, although the terms "liquid" and "fluid" may be used to refer to cooling fluid 360, cooling fluid 360 could also include solid materials, vapors, etc. Furthermore, the present subject matter is not limited by the source of cooling fluid 360. For example, cooling fluid 360 may be pumped from a storage reservoir, may be contained within leading edge assembly 300 as a solid material that liquefies at a critical temperature, seeps through leading edge portion 340 or fluid passageway, vaporizes to absorb thermal energy, and carries away thermal energy as it flows downstream.

According to an exemplary embodiment of the present subject matter, cooling fluid 360 may be solid or liquid metals. For example, according to an exemplary embodiment, cooling fluid 360 is an alkali metal. Exemplary liquid metals that may be pumped through leading edge assembly 300 as cooling fluid 360 may include at least one of cesium (Cs, with a boiling point of approximately 678° C.), potassium (K, with a boiling point of approximately 774° C.), sodium (Na, with a boiling point of approximately 883° C.), lithium (Li, with a boiling point of approximately 1347° C.), indium (In, with a boiling point of approximately 2000° C.), and/or gallium (Ga, with a boiling point of approximately 2205° C.). In addition, or alternatively, cooling fluid 360 may include ammonia ($NH_3$) or sulfur dioxide ($SO_2$). According to exemplary embodiments, cooling fluid 360 may be a mixture or combination of such liquid metals or compositions.

In addition, cooling fluid 360 may be selected based on its material properties, such as an ionization potential. The ionization potential of cooling fluid 360 may be important to facilitate magnetohydrodynamic control or generation using leading edge assembly 300 (as explained below). For example, according to an exemplary embodiment, the liquid metal cooling fluid 360 may have an ionization potential of between about 1 and 10 electronvolts (eV), between about 2 and 8 electronvolts (eV), between about 4 and 6 electronvolts (eV), or about 5 electronvolts (eV). According to exemplary embodiments, cooling fluid 360 is selected such that its ionization potential is much lower than the ionization potential for air. For example, the ionization potential for $O_2$ is approximately 12.6 eV and the ionization potential for $N_2$ is approximately 14.5 eV.

These materials can function as 'seeds' that ionize at much lower temperature than air. It should be appreciated that the term "ionization" and the like are used generally herein to refer to both complete and partial ionization. For example, the term ionization may refer to a partial or weak ionization, e.g., where the density of ions is a small fraction (say, $10^{-5}$) of the density of the neutral species. In addition, it should be appreciated that it is not only the seed species that can ionize, but instead that any present species may ionize, including oxygen and nitrogen, if the temperature is sufficiently high (e.g., due to a high Mach number).

According to alternative embodiments, cooling fluid 360 may be selected based on another material property, such as boiling temperature. According to an exemplary embodiment, cooling fluid 360 may have a boiling temperature that is less than a melting temperature of outer wall 320. In this manner, outer wall 320 or other portions of leading edge assembly 300 may be impregnated with solid materials (e.g., solid metals) that passively melt and flow as a cooling fluid 360. This melted metal cooling fluid 360 will vaporize and begin cooling outer wall 320 before outer wall 320 begins melting. In this manner, the vaporization of cooling fluid 360 on an outer surface 326 may maintain the temperature of outer wall 320 at the boiling point or boiling temperature of cooling fluid 360. If this boiling point is selected to be below a melting temperature of outer wall 320, the structural integrity of outer wall 320 may be maintained until the cooling fluid 360 has been used up. For example, according to one embodiment, the liquid metal cooling fluid 360 has a boiling temperature of greater than about 500° C., greater than about 700° C., greater than about 900° C., greater than about 1100° C., or about 750° C. In addition, or alternatively, the boiling temperature of the liquid metal cooling fluid 360 may be below about 2000° C., below about 1500° C., below about 1000° C., or below about 800° C. For example, according to an exemplary embodiment, cooling fluid 360 is lithium (Li), which boils at about 1342° C.

As used herein, the term "boiling point," "boiling temperature," and the like are referring to temperatures tabulated at 1 atm ambient pressure. However, it should be appreciated that such boiling temperatures may be different at flight conditions, e.g., when ambient and experienced pressures are different. In addition, although the boiling point of cooling fluid 360 is described as being below the melting temperature of outer wall 320, it should be appreciated that it may be desirable to have the boiling point of cooling fluid 360 even lower, e.g., corresponding to some predetermined structure temperature where the integrity of outer wall 320 begins to degrade or weaken.

It should be appreciated that the cooling fluids 360 described herein are only exemplary and are not intended to limit the scope of the present subject matter. For example, cooling fluids 360 may be selected to be liquid or solid, may have varying boiling points and ionization potentials, and may exhibit other material properties as well. For example, it may be desirable to having materials with a relatively low mass density, particularly for applications involving an aircraft. In addition, the heat of vaporization may be important to determine volume and mass of required cooling fluid 360, e.g., lithium (Li) has a uniquely high specific heat of vaporization (per unit mass). According to exemplary embodiments, cooling fluids 360 may be selected to melt at reasonably low melting temperature, e.g., to minimize the complexity required of an onboard material handling system.

In addition, or alternatively, cooling fluid 360 may be a metal phase change material. For example, the coolant may be a metal configured to change from a solid phase to liquid or gas phase when exposed to temperatures generated during operation of a hypersonic propulsion engine during hypersonic flight operations. Additionally, or alternatively, the coolant may be a metal configured to change from a liquid phase to a gas phase when exposed to temperatures generated during operation of the hypersonic propulsion engine during hypersonic flight operations. However, in other embodiments other suitable coolant may be utilized.

As best illustrated in FIG. 1, coolant supply 362 is in fluid communication with fluid passageway 350 for providing a flow of coolant 360 through fluid passageway 350. Specifically, according to the illustrated embodiment, coolant supply 362 includes a coolant reservoir 364 and a mechanical pump 366 is configured for pressurizing or supplying cooling fluid 360 to fluid passageway 350. According to still other embodiments, cooling fluid 360 may be stored within a pressurized tank for delivery to fluid passageway 350, or leading edge assembly 300 may include a system of capillary tubes or another capillary structure for driving cooling fluid 360. Alternatively, the cooling fluid 360 may be transported from any suitable location in any other suitable manner. For example, as illustrated, coolant supply 362 generally provides a flow of pressurized cooling fluid 360 into chamber 342 which is in fluid communication with fluid passageway 350. However, it should be appreciated that according to alternative embodiments, coolant supply 362 may include one or more conduits that are directly fluidly coupled to fluid passageway 350. Moreover, although cooling fluid 360 is illustrated as a single flow from a single coolant reservoir 364, it should be appreciated that one or more cooling fluid(s) 360 may be provided from a plurality of coolant reservoirs 364, may include different cooling fluid(s) 360 at different pressures, etc.

As explained above, according to an exemplary embodiment of the present subject matter, the flow of cooling fluid 360 may include liquid metal. Notably, when the liquid metal cooling fluid 360 is exposed to such high temperatures at leading edge assembly 300, it may ionize after exiting fluid passageway 350 to generate a flow of ionized vapor (e.g., as identified generally by reference numeral 370 in FIG. 1). This flow of ionized the vapor 370 passes from stagnation point 302 downstream on leading edge assembly 300. According to an exemplary embodiment, this flow of ionized vapor 370 may facilitate a magnetohydrodynamic process for power generation and/or vehicle control. Specifically, according to an exemplary embodiment, leading edge assembly 300 may include a magnetohydrodynamic generator 372 ("MHD generator") that interacts with the flow of ionized vapor 370 to generate electricity or thrust for vehicle control.

In general, MHD generator 372 may be any device suitable for interacting with the flow of ionized vapor 370 to generate electricity or thrust for vehicle control. It will be appreciated that a MEM generator 372 may generally utilize a magnetohydrodynamic converter that utilizes a Brayton cycle to transform thermal energy and kinetic energy directly into electricity. For example, MEM generator 372 may include one or more magnet coils and/or electrodes positioned proximate to or within outer wall 320. According to an exemplary embodiment, the MHD generator 372 may use the coils to generate electricity as the flow of ionized vapor 360 passes through a magnetic field generated by the coil. In addition, or alternatively, MHD generator 372 may energize the magnet coils or electrodes to interact with the flow of ionized vapor 370 in a manner that controls or adjusts flight by providing thrust to outer wall 320. MHD generator 372 may further include a controller and unique structure for implementing control methodologies for steering during high speed flight, such as during hypersonic flight.

Figure 2:
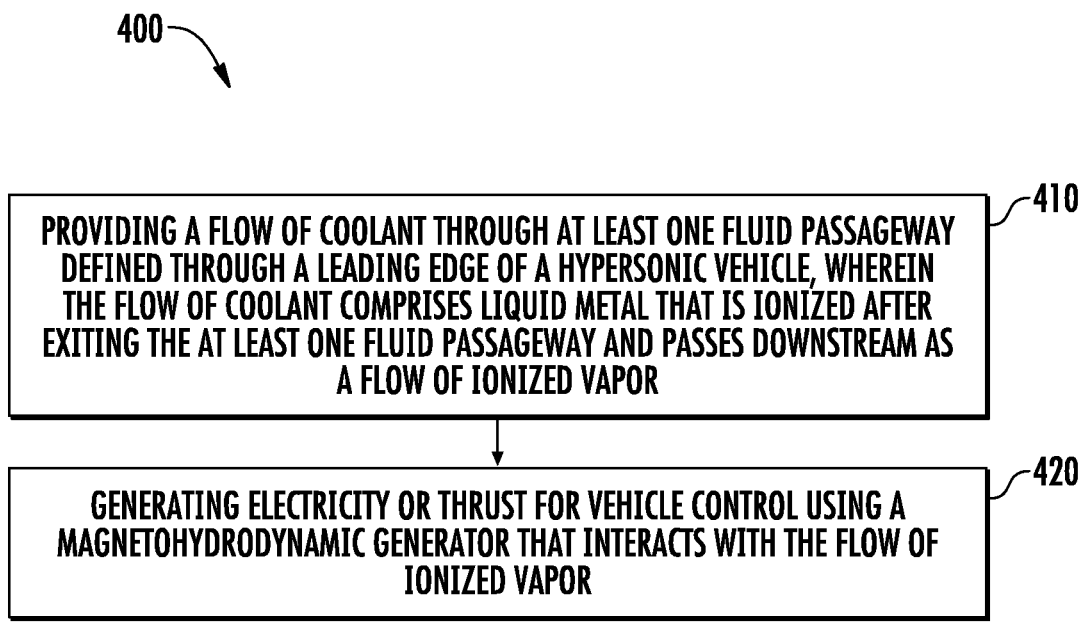
FIG. 2 is a method of cooling a leading edge and facilitating magnetohydrodynamic generation or control of a hypersonic vehicle according to an exemplary embodiment of the present subject matter.

Specifically, as best illustrated in FIG. 2, a method of operating leading edge assembly 300 may include a magnetohydrodynamic control method. Specifically, method 400 includes, at step 410, providing a flow of coolant through at least one fluid passageway defined through a leading edge of a hypersonic vehicle, wherein the flow of coolant comprises liquid metal (or any other suitable seed material) that is ionized after exiting the at least one fluid passageway and passes downstream as a flow of ionized vapor. Once the flow of ionized vapor is achieved, step 420 includes generating electricity or thrust for vehicle control using a magnetohydrodynamic generator that interacts with the flow of ionized vapor.

Figure 3:
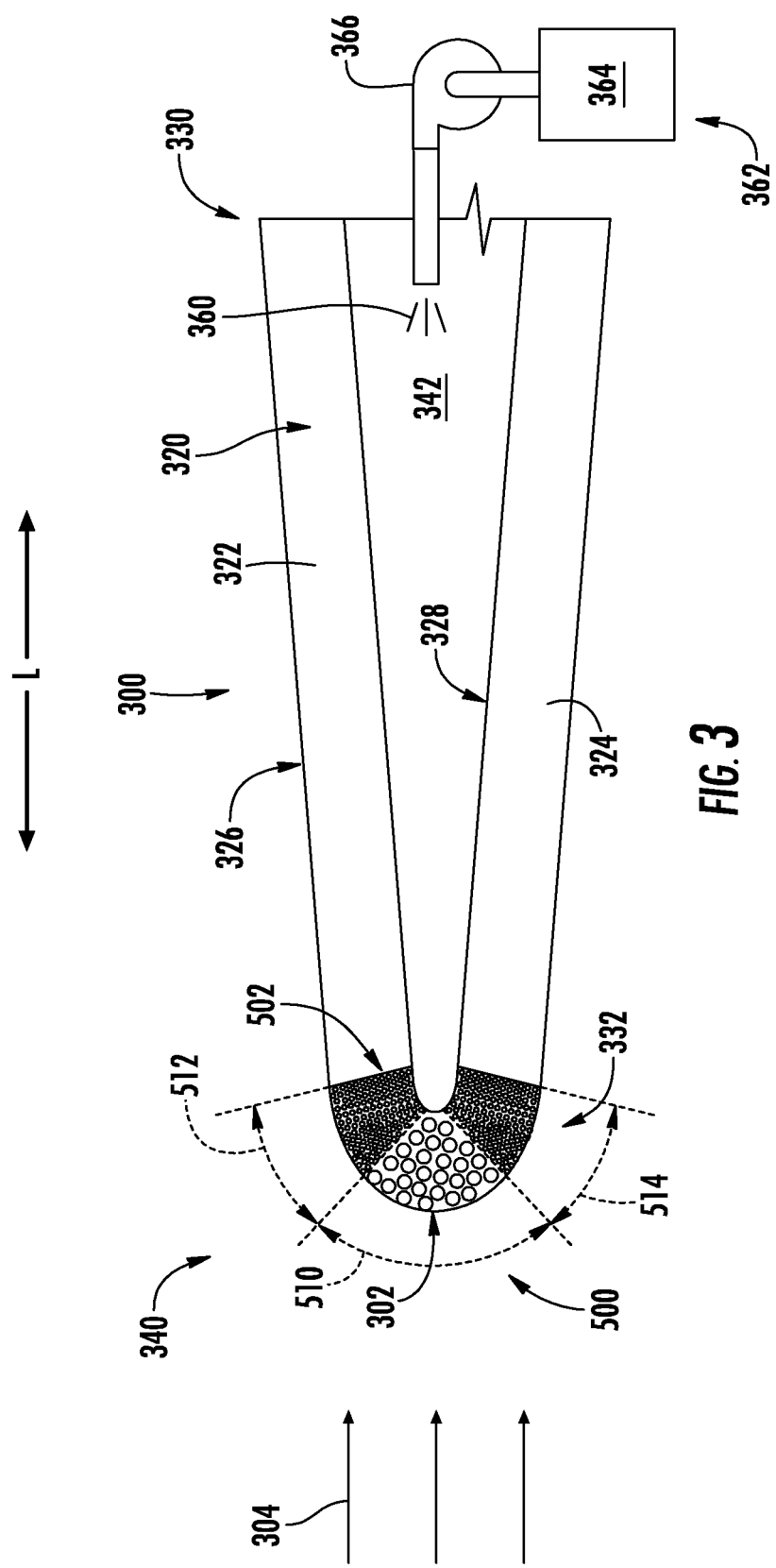
FIG. 3 is a close-up, cross-sectional, schematic view of a leading edge of a hypersonic vehicle in accordance with another exemplary embodiment of the present disclosure.
Figure 4:
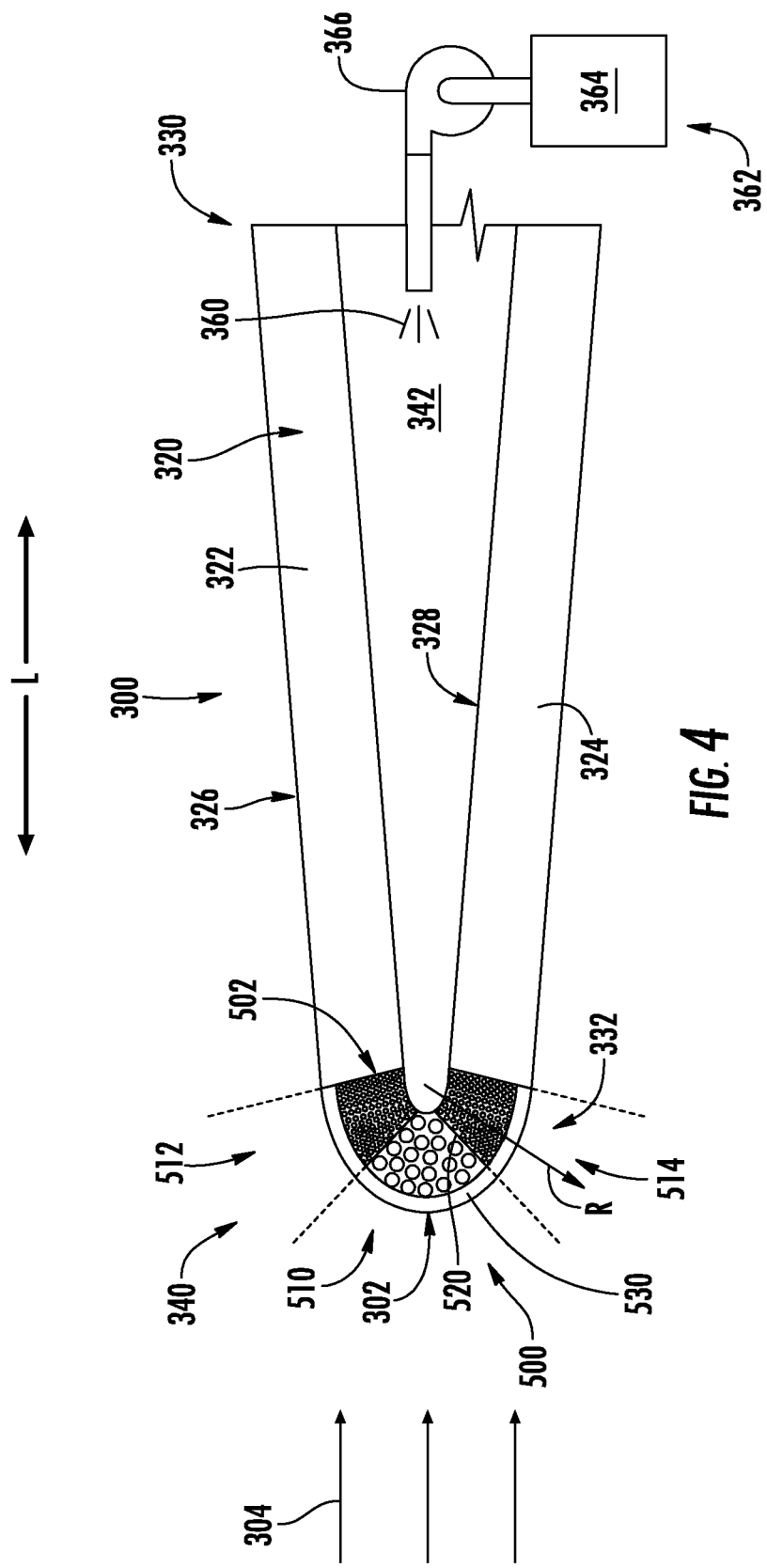
FIG. 4 is a close-up, cross-sectional, schematic view of a leading edge of a hypersonic vehicle in accordance with another exemplary embodiment of the present disclosure.

In addition, or alternatively, as best shown in FIGS. 3 and 4, the leading edge portion 340 may be configured as a porous leading edge portion, identified herein as porous tip 500. According to an exemplary embodiment, the leading edge assembly 300 is configured to provide a flow of cooling fluid 360 through the chamber 342 to the inner surface 328 of the leading edge portion 340, such that the flow of cooling fluid 360 may seep through the porous tip 500 and cool the leading edge portion 340 during operation of a hypersonic vehicle or a hypersonic propulsion engine, e.g., during hypersonic flight operations. In this regard, fluid passageways 350 may be defined through the porous structure that composes or defines porous tip 500. In describing figures herein, it should be appreciated that like reference numerals may be used to refer to the same or similar features between embodiments.

Specifically, as shown in FIGS. 3 and 4, an outer wall 320 of leading edge assembly 300 includes a first wall section 322 and a second wall section 324, each of which extend from the a forward end 502 and an aft end (which may correspond, for example, with aft end 330 of leading edge assembly 300) along the longitudinal direction L. Notably, forward ends 502 of first wall section 322 and second wall section 324 may stop short of stagnation point 302. In addition, porous tip 500 may be joined to forward ends 502 of first wall section 322 and second wall section 324. In this regard, porous tip 500 may generally be defined as a curved region coupled to first wall section 322 and second wall second 324, which are illustrated as being substantially straight.

According to exemplary embodiments, for example, first wall section 322, second wall section 324, and tip portion 500 may be simultaneously additively manufactured as a single, integral, and monolithic piece. However, as will be described in more detail below, outer wall 320 may be substantially solid and hermetic, while porous tip 500 may include a porous structure for permitting a flow of cooling fluid 360 to pass therethrough toward forward end 332 of leading edge assembly 300.

According to an exemplary embodiment, the leading edge portion 340, or more specifically porous tip 500, may define a constant porosity for passing cooling fluid 360. As used herein, the term "porosity" may be used generally to refer to a measure of the void or empty spaces within a material or structure. Thus, a structure having porosity has open passages, cells, or structures through which fluidly may flow from one porous cell to another. For example, porosity may be used to refer to a fraction of the volume of voids or open space over a total volume of a component. According to exemplary embodiments, the porosity of porous tip 500 may be greater than about 5%, 10%, 20%, 40% or greater than even 50%. In addition, or alternatively, the porosity of porous tip 500 may be less than about 80% 60%, 40%, 20%, or 5%. It should be appreciated that the porosity of porous tip 500 may vary depending on the application while remaining within scope of the present subject matter. For example, the porosity may vary based on the mass flow rate of the cooling fluid 360, the mechanical properties of porous tip 500, based on anticipated flight conditions, or based on any other suitable parameters.

Notably, according to the illustrated embodiment, porous tip may define a variable porosity, e.g., in order to concentrate a cooling fluid 360 proximate the stagnation point 302. More specifically, the porous tip 500 may include a first porous region 510, a second porous region 512, and a third porous region 514. According to the illustrated embodiment, first porous region 510 is positioned at forward end 322 of leading edge assembly 300 and includes the stagnation point 302. By contrast, each of second porous region 512 and third porous region 514 are positioned downstream of first porous region 510 or stagnation point 302. According to an exemplary embodiment, a first porosity of first porous region 510 is different than a second porosity of second porous region 512. More specifically, according to an exemplary embodiment, the first porosity is greater than the second porosity. Similarly, the third porosity may be the same as or different and the second porosity, but is also less than the first porosity. For example, according to an exemplary embodiment, the first porosity may be at least about 10 percent greater than the second and third porosity, such as at least about 25 percent greater, such as at least about 50 percent greater, such as at least about 100 percent greater, and up to about 1000 percent greater porosity than the second and third porosity.

Similar to the embodiments described above, coolant supply 362 may be in fluid communication with chamber 342 and/or porous tip 500 for providing a flow of coolant 360 through porous tip 500. Specifically, according to the illustrated embodiment, inner surface 328 of porous tip 500 is exposed to a pressurized cooling fluid 360 within chamber 342. However, the amount of cooling fluid 360 that flows through first porous region 510 may be greater than the amount of cooling fluid 360 flowing through one or both of second porous region 512 and third porous region 514. Notably, the ratio or amount of cooling fluid 360 flowing through each region of porous tip 500 may be adjusted by manipulating the porosities within each region 510-514.

According to the illustrated embodiment, it is desirable to have the highest porosity in first porous region 510 to direct the largest amount of cooling fluid 360 toward the most heat affected region, i.e., stagnation point 302. In addition, higher porosity at the stagnation point 302 may help compensate for the fact that the pressure is highest at this point, which decreases the amount of cooling fluid 360 that naturally flows toward stagnation point 302.

Notably, porous tip 500 is illustrated as having three distinct porous regions 510-514. However, it should be appreciated that using the additive manufacturing techniques described herein, porous tip 500 may have a progressively varying porosity, i.e., such that the porosity continuously and progressively increases from forward end 502 of outer wall 320 to the highest porosity at stagnation point 302. In this manner, porous tip 500 may be envisioned as having 10, 20, 50, 100, or even more subregions, each of which has a progressively increasing porosity as they approach stagnation point 302. As illustrated, each of these subregions extends from the inner surface 328 to outer surface 326 along the radial direction R and has a substantially constant porosity along the radial direction R. In addition, according to alternative embodiments, one or more of these regions, such as porous regions 510-514, may also vary in porosity along the radial direction R.

According to exemplary embodiments, porous tip 500 may include additional features for directing the flow of cooling fluid 360 to the desired locations within leading edge assembly 300. In this regard, referring for example to FIG. 4, porous tip 500 may include a plurality of internal barriers 520 that separate one or more of porous regions 510-514. In this regard, as illustrated, internal barriers 520 are straight and solid walls that extend substantially along the radial direction R from inner surface 328 to outer surface 326. However, according to alternative embodiments, porous tip 500 may have more internal barriers 520, the internal barriers 520 may extend in other directions through outer wall 320, may have varying thicknesses, etc. Other configurations are possible and within the scope of the present subject matter.

Referring now specifically to FIG. 4, leading edge assembly 300 may include a nose cover 530 that is positioned at least partially over porous tip 500 to restrict the flow of cooling fluid 360 from coolant reservoir 364 and/or chamber 342. Specifically, nose cover 530 prevents cooling fluid 360 from escaping porous tip 500 or leading edge portion 340, but may be made from a material that ablates or melts away when the leading edge assembly 300 is exposed to a predetermined critical temperature. In this regard, for example, nose cover 530 may be constructed from a material that melts before porous tip 500 and outer wall 320 reach their melting temperatures. Notably, when nose cover 530 melts, cooling fluid 360 is released to cool or maintain the temperature of leading edge assembly 300 at or below the melting point of porous tip 500 and/or outer wall 320 (e.g., there is no flow of cooling fluid 360 until nose cover 530 melts). Thus, according to an exemplary embodiment, the predetermined critical temperature at which nose cover 530 melts is below a temperature at which the structural integrity of leading edge assembly 300 begins to deteriorate. Although nose cover 530 is illustrated as being used with a porous tip 500 having variable porosity, it should be appreciated that these two features may be used together or independently of each other.

According to the illustrated embodiment, the nose cover 530 extends over the entire porous tip 500, e.g., from forward end 502 of first wall section 322 along the circumferential direction C to forward end 502 of second wall section 324. Notably, according to an exemplary embodiment, nose cover 530 is impermeable by the flow of cooling fluid 360. Therefore, cooling fluid 360 is contained within porous tip 500, coolant reservoir 364, and/or chamber 342 until the nose cover 530 melts, which corresponds to a time when cooling of leading edge assembly 300 is needed. According to alternative embodiments, nose cover 530 may cover less than the entire portion of porous tip 500. For example, nose cover 530 may cover only a forward end 332 of first porous region 510. Alternatively, nose cover 530 may cover only second porous region 512 and third porous region 514. According to still other embodiments, a thickness of nose cover 530 (which may be measured substantially along the radial direction R), may vary depending on the circumferential location along porous tip 500. According to still other embodiments, nose cover 530 may be a plug positioned at outlet 354 of fluid passageway 350 (e.g., as shown in FIG. 1). In this regard, for example, nose cover 530 may extend at least partially within fluid passageway 350. Other variations and modifications to nose cover 530 may be made while remaining within the scope of the present subject matter. For example, it should be appreciated that nose cover 530 can be made by filling pores with a different material to block the pores and form nose cover 530, by attaching a separate cap element to leading edge assembly 300, etc.

Figure 5:
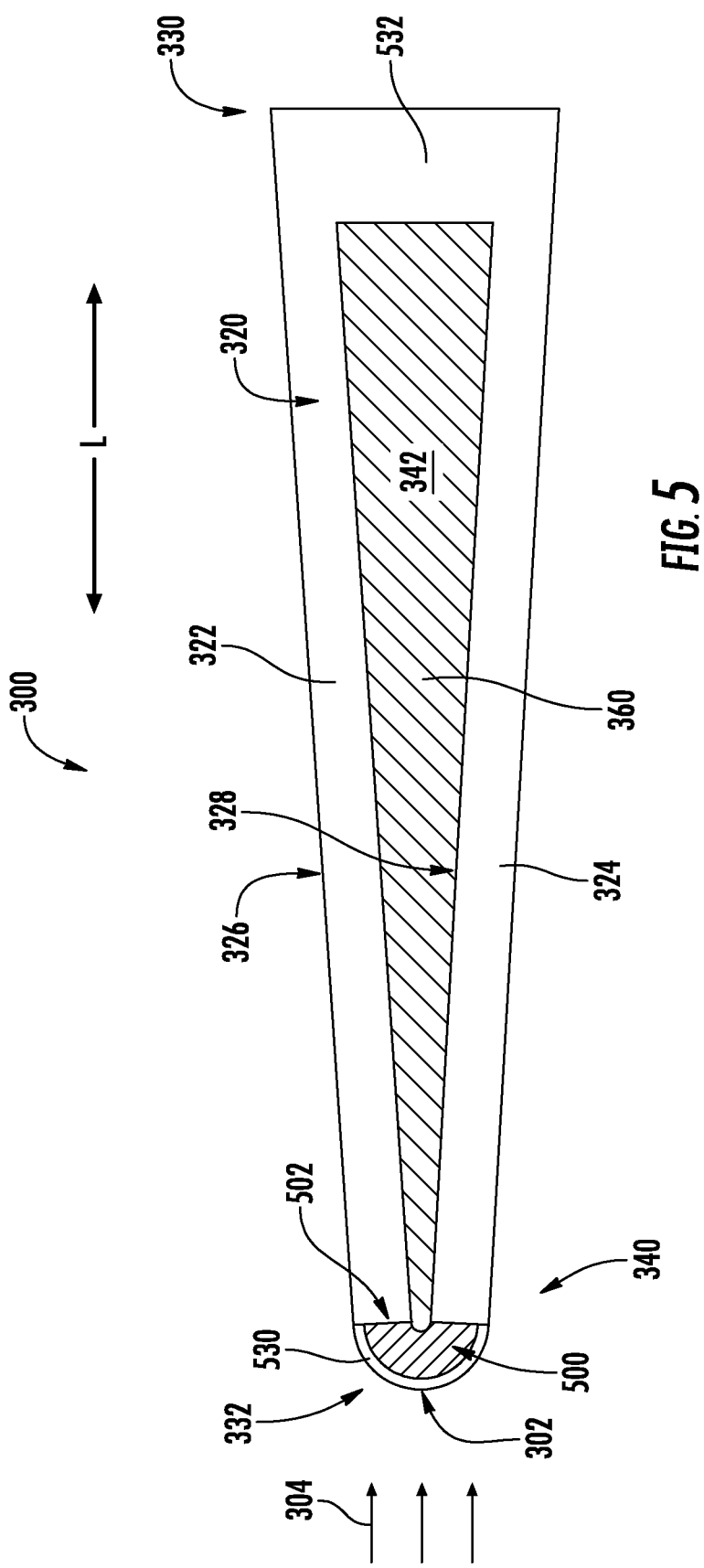
FIG. 5 is a close-up, cross-sectional, schematic view of a leading edge of a hypersonic vehicle in accordance with another exemplary embodiment of the present disclosure.

Referring now to FIG. 5, leading edge assembly 300 may include an aft bulkhead 532 positioned at an aft end 330 of outer wall 320 and extending substantially perpendicular to a longitudinal direction L. As shown, chamber 342 is enclosed and defined between the aft bulkhead 532, first wall section 322, second wall section 324, and nose cover 530. Thus, chamber 342 may be a constant volume chamber or reservoir. For example, aft bulkhead 532 may connect to the rest of a hypersonic vehicle, may be a replaceable component, etc. According to such an exemplary embodiment, chamber 342 may be charged with cooling fluid 360. Notably, as leading edge assembly 300 heats up during hypersonic operation, nose cover 530 may slowly melt while the pressure within chamber 342 increases due to the increased temperature of the cooling fluid 360. Once the temperature of leading edge assembly 300 has reached the critical temperature, nose cover 530 melts away and chamber 342 is sufficiently pressurized to drive the flow of cooling fluid 360 through porous tip 500 to cool the leading edge assembly 300.

According to still other embodiments, porous tip 500 may be filled with a material that seeps out of porous tip 500 when nose cover 530 melts or ablates away. More specifically, according to an exemplary embodiment, porous tip 500 may be filled with a metal cooling fluid 360 (e.g., in solid form) that may have a relatively low melting point, such that the metal filling the pores of porous tip 500 is configured to melt during operation of a hypersonic propulsion engine or a hypersonic aircraft during high temperature operations, such as hypersonic flight operations. Once the metal cooling fluid 360 that fills the pores of porous tip 500 is melted, the cooling fluid 360 may flow through porous tip 500 in a similar manner as described above with reference to FIG. 4.

Further aspects of the invention are provided by the subject matter of the following clauses:

1. A leading edge assembly for a hypersonic vehicle, the leading edge assembly comprising: an outer wall that is tapered to a forward end; a porous tip joined to the forward end of the outer wall and extending forward toward a leading edge, the porous tip comprising a first porous region at the leading edge and a second porous region downstream from the leading edge, wherein a first porosity of the first porous region is greater than a second porosity of the second porous region; and a coolant supply in fluid communication with the porous tip for providing a flow of coolant through the first porous region and the second porous region.

2. The leading edge assembly of any preceding clause, wherein the porous tip defines a porosity that progressively increases toward the leading edge.

3. The leading edge assembly of any preceding clause, wherein the porous tip defines a radial direction extending from a center of curvature of the porous tip and a circumferential direction, the porous tip comprising a plurality of porous segments spaced apart along the circumferential direction, each of the plurality of porous segments extending from an inner surface of the porous tip to an outer surface of the porous tip.

4. The leading edge assembly of any preceding clause, wherein at least two of the plurality of porous segments have different porosities.

5. The leading edge assembly of any preceding clause, where a porosity within at least one of the plurality of porous segments varies along the radial direction.

6. The leading edge assembly of any preceding clause, wherein each of the plurality of porous segments are separated by an internal barrier.

7. The leading edge assembly of any preceding clause, wherein the internal barrier is straight and extends substantially along the radial direction.

8. The leading edge assembly of any preceding clause, wherein the outer wall comprises a first wall section and a second wall section separated by one or more coolant reservoirs, the leading edge assembly further comprising: a nose cover positioned at least partially over the porous tip to restrict the flow of coolant within the one or more coolant reservoirs until melted, the nose cover being formed from a material that ablates or melts when the leading edge is exposed to a predetermined critical temperature.

9. The leading edge assembly of any preceding clause, wherein the nose cover extends from the first wall section all the way around the porous tip to the second wall section.

10. The leading edge assembly of any preceding clause, wherein the nose cover is impermeable by the flow of coolant.

11. The leading edge assembly of any preceding clause, further comprising an aft bulkhead, wherein the one or more coolant reservoirs are defined between the aft bulkhead, the first wall section, the second wall section, and the nose cover.

12. The leading edge assembly of any preceding clause, wherein the one or more coolant reservoirs have a fixed volume and is charged with the flow of coolant such that a coolant pressure increases as an operating temperature of the leading edge assembly increases.

13. The leading edge assembly of any preceding clause, wherein the first wall section and the second wall second are substantially straight, and wherein the porous tip is defined as a curved region joining the first wall section and the second wall section.

14. The leading edge assembly of any preceding clause, wherein the flow of coolant comprises at least one of air, water, steam, liquid metal, carbon dioxide, or helium.

15. The leading edge assembly of any preceding clause, wherein the coolant supply comprises: a pump or a capillary system for directing the coolant toward the porous tip.

16. A porous tip for a leading edge assembly of a hypersonic vehicle, the porous tip defining a radial direction extending from a center of curvature of the porous tip and a circumferential direction, the porous tip comprising: a plurality of porous segments spaced apart along the circumferential direction, each of the plurality of porous segments extending from an inner surface of the porous tip to an outer surface of the porous tip, wherein at least two of the plurality of porous segments have different porosities; and a plurality of internal barriers, each of the plurality of porous segments being separated from adjacent segments of the plurality of porous segments by at least one of the plurality of internal barriers.

17. The porous tip of any preceding clause, wherein a porosity of the plurality of porous segments progressively increases toward a leading edge of the porous tip.

18. The porous tip of any preceding clause, wherein a porosity within at least one of the plurality of porous segments varies along the radial direction.

19. The porous tip of any preceding clause, further comprising: a nose cover positioned at least partially over the porous tip to restrict a flow of coolant through the porous tip until melted, the nose cover being formed from a material that ablates or melts when the porous tip is exposed to a predetermined critical temperature.

20. A leading edge assembly for a hypersonic vehicle, the leading edge assembly comprising: an outer wall that is tapered to a forward end; a porous tip joined to the forward end of the outer wall and extending forward toward a leading edge, the porous tip comprising a plurality of porous regions, each of the plurality of porous regions having a different porosity, and wherein the plurality of porous regions are spaced apart along a circumferential direction or a radial direction; and a coolant supply in fluid communication with the porous tip for providing a flow of coolant through the plurality of porous regions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A leading edge assembly for a hypersonic vehicle, the leading edge assembly comprising:
   an outer wall that is tapered to a forward end;
   a porous tip joined to the forward end of the outer wall and extending forward toward a leading edge, the porous tip comprising a first porous region at the leading edge and a second porous region downstream from the leading edge, wherein a first porosity of the first porous region is greater than a second porosity of the second porous region; and
   a coolant supply in fluid communication with the porous tip for providing a flow of coolant through the first porous region and the second porous region,
   wherein the outer wall comprises a first wall section and a second wall section separated by one or more coolant reservoirs, and
   wherein the leading edge assembly further comprises a nose cover positioned at least partially over the porous tip to restrict the flow of coolant within the one or more coolant reservoirs until melted, the nose cover being formed from a material that ablates or melts when the leading edge is exposed to a predetermined critical temperature.

2. The leading edge assembly of claim 1, wherein the porous tip defines a porosity that progressively increases toward the leading edge.

3. The leading edge assembly of claim 1, wherein the porous tip defines a radial direction extending from a center of curvature of the porous tip and a circumferential direction, the porous tip comprising a plurality of porous segments spaced apart along the circumferential direction, each of the plurality of porous segments extending from an inner surface of the porous tip to an outer surface of the porous tip.

4. The leading edge assembly of claim 3, wherein at least two of the plurality of porous segments have different porosities.

5. The leading edge assembly of claim 3, where a porosity within at least one of the plurality of porous segments varies along the radial direction.

6. The leading edge assembly of claim 1, wherein the nose cover extends from the first wall section all the way around the porous tip to the second wall section.

7. The leading edge assembly of claim 1, wherein the nose cover is impermeable by the flow of coolant.

8. The leading edge assembly of claim 1, further comprising an aft bulkhead, wherein the one or more coolant reservoirs are defined between the aft bulkhead, the first wall section, the second wall section, and the nose cover.

9. The leading edge assembly of claim 8, wherein the one or more coolant reservoirs have a fixed volume and are charged with the flow of coolant such that a coolant pressure increases as an operating temperature of the leading edge assembly increases.

10. The leading edge assembly of claim 1, wherein the first wall section and the second wall section are substantially straight, and wherein the porous tip is defined as a curved region joining the first wall section and the second wall section.

11. The leading edge assembly of claim 1, wherein the flow of coolant comprises at least one of air, water, steam, liquid metal, carbon dioxide, or helium.

12. The leading edge assembly of claim 1, wherein the coolant supply comprises:
a pump or a capillary system for directing the coolant toward the porous tip.

13. A leading edge assembly for a hypersonic vehicle, the leading edge assembly comprising:
an outer wall that is tapered to a forward end;
a porous tip joined to the forward end of the outer wall and extending forward toward a leading edge, the porous tip comprising a first porous region at the leading edge and a second porous region downstream from the leading edge, wherein a first porosity of the first porous region is greater than a second porosity of the second porous region; and
a coolant supply in fluid communication with the porous tip for providing a flow of coolant through the first porous region and the second porous region,
wherein the porous tip defines a radial direction extending from a center of curvature of the porous tip and a circumferential direction, the porous tip comprising a plurality of porous segments spaced apart along the circumferential direction, each of the plurality of porous segments extending from an inner surface of the porous tip to an outer surface of the porous tip, and
wherein each of the plurality of porous segments are separated by an internal barrier.

14. The leading edge assembly of claim 13, wherein the internal barrier is straight and extends substantially along the radial direction.

15. The leading edge assembly of claim 13,
wherein the outer wall comprises a first wall section and a second wall section separated by one or more coolant reservoirs,
the leading edge assembly further comprising:
a nose cover positioned at least partially over the porous tip to restrict the flow of coolant within the one or more coolant reservoirs until melted, the nose cover being formed from a material that ablates or melts when the leading edge is exposed to a predetermined critical temperature.

16. A porous tip for a leading edge assembly of a hypersonic vehicle, the porous tip defining a radial direction extending from a center of curvature of the porous tip and a circumferential direction, the porous tip comprising:
a plurality of porous segments spaced apart along the circumferential direction, each of the plurality of porous segments extending from an inner surface of the porous tip to an outer surface of the porous tip, wherein at least two of the plurality of porous segments have different porosities;
a plurality of internal barriers, each of the plurality of porous segments being separated from adjacent segments of the plurality of porous segments by at least one of the plurality of internal barriers; and
a nose cover positioned at least partially over the porous tip to restrict a flow of coolant through the porous tip until melted, the nose cover being formed from a material that ablates or melts when the porous tip is exposed to a predetermined critical temperature.

17. The porous tip of claim 16, wherein a porosity of the plurality of porous segments progressively increases toward a leading edge of the porous tip.

18. The porous tip of claim 16, wherein a porosity within at least one of the plurality of porous segments varies along the radial direction.

19. A leading edge assembly for a hypersonic vehicle, the leading edge assembly comprising:
an outer wall that is tapered to a forward end;
a porous tip joined to the forward end of the outer wall and extending forward toward a leading edge, the porous tip comprising a plurality of porous regions, each of the plurality of porous regions having a different porosity; and
a coolant supply in fluid communication with the porous tip for providing a flow of coolant through the plurality of porous regions,
wherein the porous tip defines a radial direction extending from a center of curvature of the porous tip and a circumferential direction, the porous tip comprising a plurality of porous segments spaced apart along the circumferential direction, each of the plurality of porous segments extending from an inner surface of the porous tip to an outer surface of the porous tip, and
wherein each of the plurality of porous segments are separated by an internal barrier.

\* \* \* \* \*